(12) United States Patent
Jing et al.

(10) Patent No.: US 10,069,871 B2
(45) Date of Patent: Sep. 4, 2018

(54) MEASURING SESSION INITIATION PROTOCOL (SIP) MESSAGING LATENCY

(71) Applicant: Verizon Patent and Licensing Inc., Arlington, VA (US)

(72) Inventors: Yi Jing, Belmont, MA (US); Jeffrey R. Evans, Lovettsville, VA (US); Robert P. Faber, Jr., Aurora, CO (US); Taral Patel, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 15/012,058

(22) Filed: Feb. 1, 2016

(65) Prior Publication Data

US 2017/0223062 A1 Aug. 3, 2017

(51) Int. Cl.
*G06F 15/16* (2006.01)
*H04L 12/16* (2006.01)
*H04L 29/06* (2006.01)
*H04L 12/26* (2006.01)

(52) U.S. Cl.
CPC .......... *H04L 65/1006* (2013.01); *H04L 43/00* (2013.01); *H04L 65/1069* (2013.01)

(58) Field of Classification Search
CPC ... G06Q 10/10; H04L 29/06; H04L 29/08072; H04L 29/06027; H04L 12/581; H04L 47/10; H04L 47/2441; H04L 47/30; H04L 47/32; H04L 12/5693; H04Q 3/66; H04Q 3/0016; H04Q 2213/13141; H04Q 2213/13103; H04Q 3/0029
USPC .......................................................... 709/204
See application file for complete search history.

(56) References Cited

U.S. PATENT DOCUMENTS

| | | | | |
|---|---|---|---|---|
| 8,358,765 | B1* | 1/2013 | Whitten ................... | H04M 3/02 379/211.02 |
| 9,042,239 | B2* | 5/2015 | Shand .................... | H04W 24/08 370/241 |
| 2003/0148779 | A1* | 8/2003 | Aravamudan .......... | H04L 29/06 455/519 |
| 2005/0068962 | A1* | 3/2005 | Hillenbrand ...... | H04L 29/06027 370/395.2 |
| 2005/0141541 | A1* | 6/2005 | Cuny .................. | H04L 65/4061 370/437 |
| 2005/0180435 | A1* | 8/2005 | Hsu ..................... | H04L 12/4625 370/401 |
| 2005/0237999 | A1* | 10/2005 | Shores .................... | H04L 1/188 370/352 |
| 2006/0088065 | A1* | 4/2006 | Khatter ................. | H04M 7/006 370/528 |

(Continued)

Primary Examiner — Mahran Abu Roumi

(57) ABSTRACT

A device may receive a first session initiation protocol (SIP) message from another device, and may determine a first timestamp associated with the first SIP message. The first timestamp may represent a receipt time of the first SIP message by the device. The device may determine a second timestamp associated with a second SIP message. The second timestamp may represent a transmission time of the second SIP message by the device, and may be a response to the first SIP message. The device may determine a device latency value representing a difference between the second timestamp and the first timestamp. The device may provide the second SIP message to the other device at the transmission time. The second SIP message may include the device latency value.

20 Claims, 10 Drawing Sheets

(56) References Cited

U.S. PATENT DOCUMENTS

| | | | | |
|---|---|---|---|---|
| 2006/0165043 A1* | 7/2006 | Yoon | H04L 29/06027 | 370/346 |
| 2006/0203831 A1* | 9/2006 | Yoshizawa | H04L 29/06027 | 370/401 |
| 2006/0221837 A1* | 10/2006 | Gardner | H04L 29/06027 | 370/241 |
| 2006/0227766 A1* | 10/2006 | Mickle | H04L 29/06027 | 370/356 |
| 2006/0250988 A1* | 11/2006 | Garcia | H04L 29/06027 | 370/260 |
| 2007/0097886 A1* | 5/2007 | Schwagmann | H04L 12/1813 | 370/260 |
| 2007/0206620 A1* | 9/2007 | Cortes | H04L 29/06027 | 370/412 |
| 2008/0267081 A1* | 10/2008 | Roeck | H04L 47/10 | 370/249 |
| 2008/0282254 A1* | 11/2008 | Blander | H04L 67/1029 | 718/105 |
| 2009/0019158 A1* | 1/2009 | Langen | H04L 67/1095 | 709/226 |
| 2009/0122704 A1* | 5/2009 | DeVal | H04L 41/0681 | 370/235 |
| 2009/0196183 A1* | 8/2009 | Kakadia | H04L 12/14 | 370/237 |
| 2010/0329130 A1* | 12/2010 | Paine | H04L 41/5035 | 370/252 |
| 2011/0307624 A1* | 12/2011 | Shatsky | H04L 65/1016 | 709/231 |
| 2012/0163184 A1* | 6/2012 | Choi | H04L 65/1016 | 370/241 |
| 2014/0064155 A1* | 3/2014 | Evans | H04L 65/1006 | 370/259 |
| 2014/0068710 A1* | 3/2014 | Lau | G06F 21/00 | 726/3 |
| 2014/0317190 A1* | 10/2014 | Mendiratta | H04L 67/14 | 709/204 |
| 2015/0023170 A1* | 1/2015 | Kakadia | H04L 41/0823 | 370/235 |
| 2016/0044160 A1* | 2/2016 | Redmann | H04M 3/42204 | 379/88.03 |
| 2016/0105780 A1* | 4/2016 | Hooker | H04L 65/1016 | 370/338 |
| 2017/0126752 A1* | 5/2017 | Perreault | H04L 65/1069 | |
| 2017/0161377 A1* | 6/2017 | Cartwright | G06F 17/30752 | |

* cited by examiner

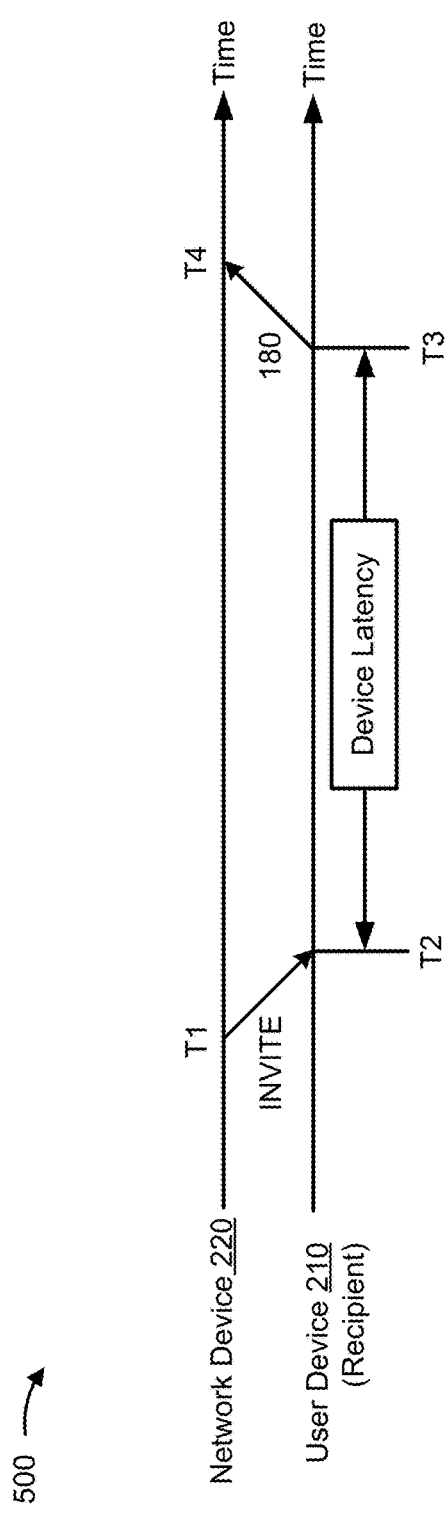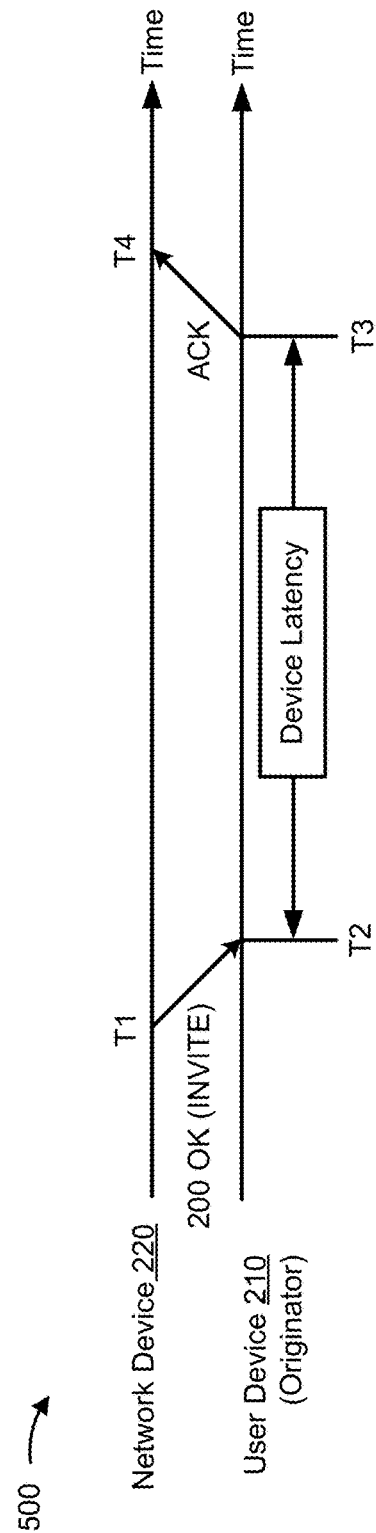
FIG. 5A
FIG. 5B

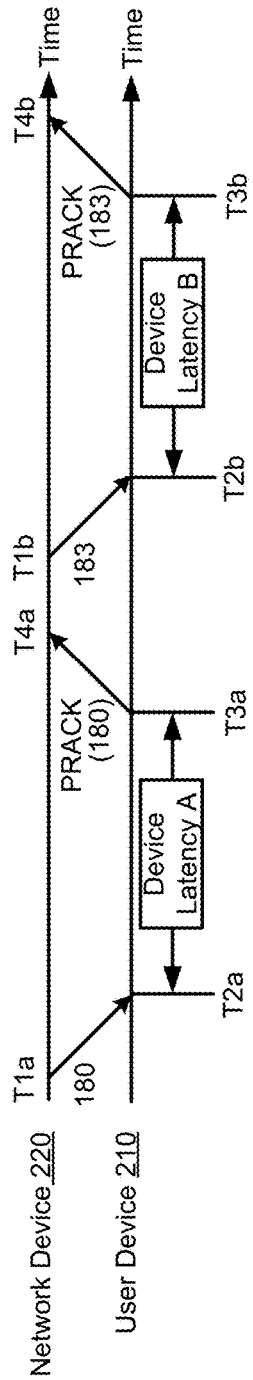

MEASURING SESSION INITIATION PROTOCOL (SIP) MESSAGING LATENCY

BACKGROUND

Session Initiation Protocol (SIP) is a communications protocol for signaling and controlling multimedia communication sessions, such as Internet telephony applications, multicast sessions, etc. A SIP user agent (UA) is a logical network end-point used to create or receive SIP messages and thereby manage a SIP session. A SIP UA may perform the role of a user agent client (UAC) which sends a SIP request, or a user agent server (UAS), which receives the SIP request and returns a SIP response.

BRIEF DESCRIPTION OF THE DRAWINGS

FIGS. 5A and 5B are diagrams of example implementations relating to the example process shown in FIG. 4;

FIGS. 7A and 7B are diagrams of example implementations relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A network operator may desire to obtain network metrics associated with SIP messaging. Network metrics such as network latency values (e.g., associated with a time between when a first device provides a SIP message and when a second device receives the SIP message, and/or a time between when the second device sends another SIP message and the first device receives the other SIP message) or device latency values (e.g., associated with a time between when a device receives a SIP message and when the device responds to the SIP message) may assist a network operator in improving Voice over Long Term Evolution (VoLTE) services and/or other services that use a SIP messaging architecture.

For example, network metrics associated with SIP messaging may allow a network operator to reduce post dial delay (e.g., a time between when a caller places a call and when ringing occurs), post answer delay (e.g., a time between when a callee answers a call and when the caller receives audio), or the like by designing the network in a more efficient and latency-sensitive manner.

A network operator may obtain network metrics by installing logging tools on user devices and/or network devices. However, collecting network metrics in this manner may be difficult, time consuming, error prone, incomplete, and may require manual effort to correlate network logs with device logs. Implementations described herein may assist a network operator in efficiently measuring SIP messaging latency and/or collecting network metrics associated with SIP messaging. Additionally, implementations described herein may conserve processor and/or memory resources required to determine user device latency values. For example, implementations described herein may allow a network operator to collect network metrics without requiring clock synchronization between a network device and a user device, thereby conserving processor and/or memory resources.

By providing a network operator with network metrics, implementations described herein may allow a network operator to design a network in a more efficient and latency-sensitive manner, thereby conserving network resources. Additionally, implementations described herein may improve SIP messaging between user devices, thereby conserving user device processor and/or memory resources.

Figure 1A:
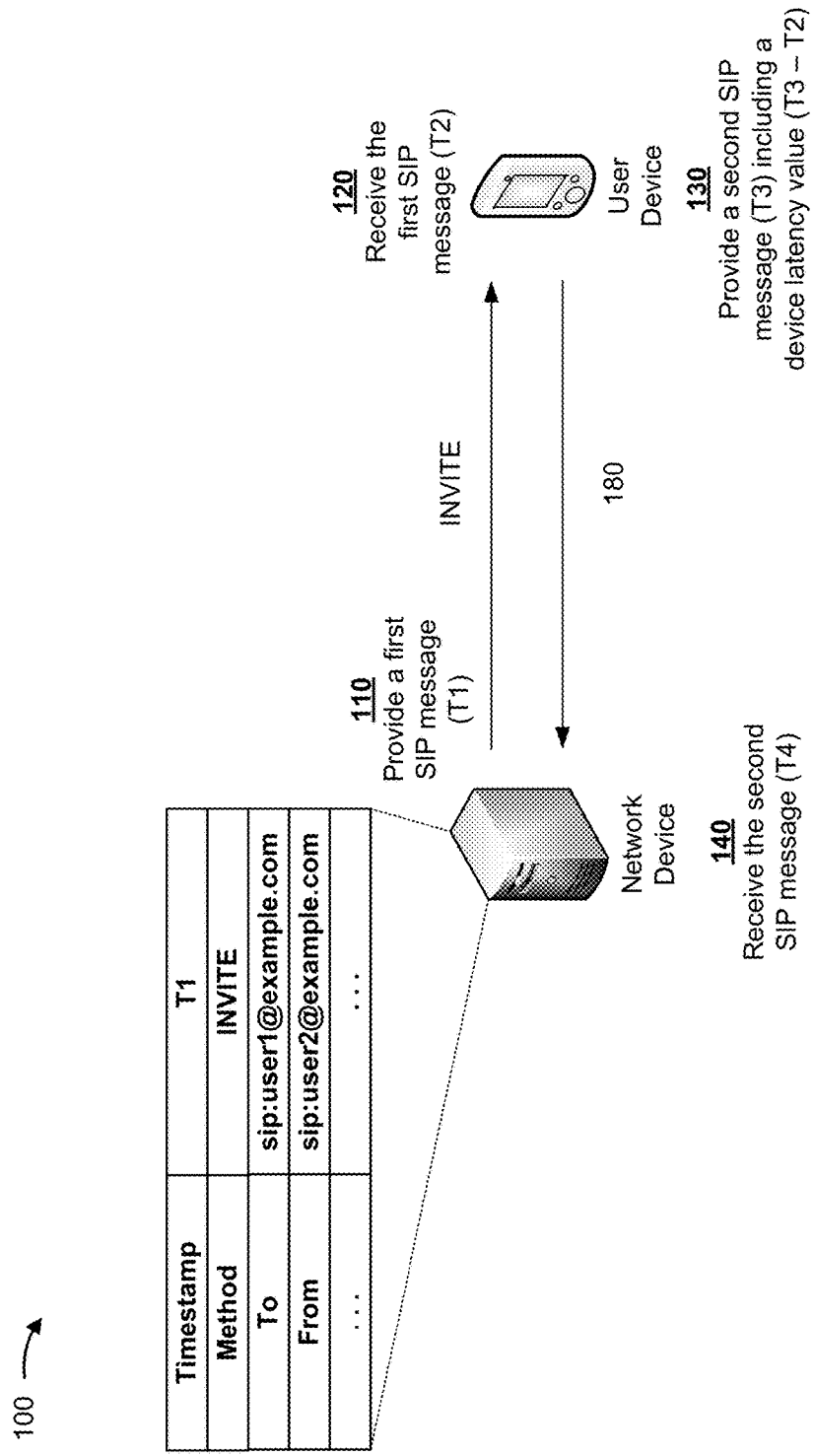
FIGS. 1A and 1B are diagrams of an overview of an example implementation described herein.
Figure 1B:
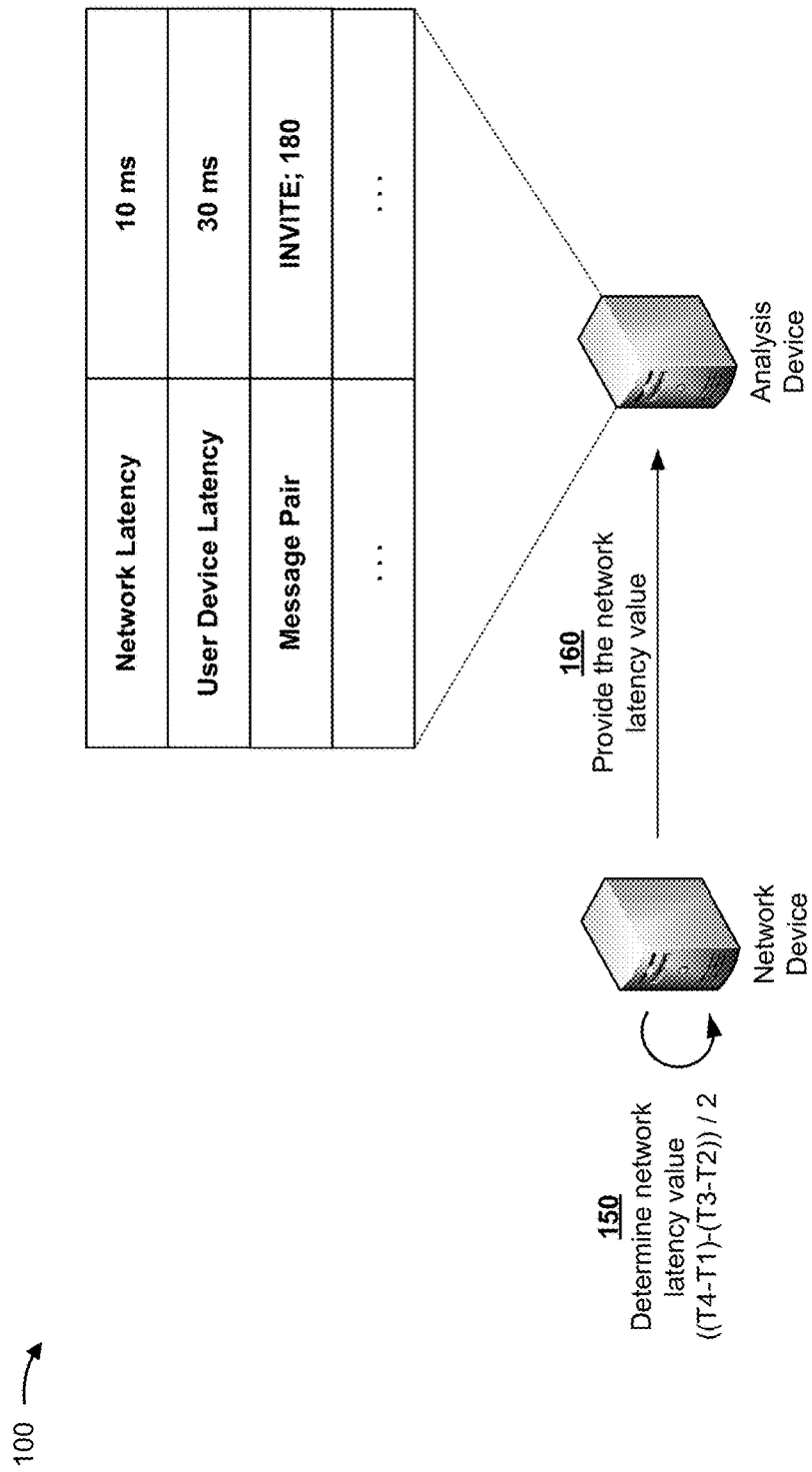

FIGS. 1A and 1B are diagrams of an overview of an example implementation 100 described herein. As shown in FIG. 1A, and by reference number 110, a network device may provide a first SIP message to a user device. Additionally, the network device may determine a first timestamp (T1) that represents a transmission time of the first SIP message by the network device (e.g., a time that the first SIP message was transmitted by the network device).

For example, as shown, the first SIP message may include the request method "INVITE." As shown, the network device may store information (e.g., in a data structure) identifying the first timestamp (T1), the request method associated with the first SIP message (INVITE), a SIP uniform resource identifier (URI) associated with an intended recipient of the first SIP message (sip:user1@example.com), a SIP URI associated with an originator of the first SIP message (sip:user2@example.com), or the like.

As shown by reference number 120, the user device may receive the first SIP message, and may determine a second timestamp (T2) that represents the receipt time of the first SIP message by the user device (e.g., a time that the first SIP message was received by the user device). As shown by reference number 130, the user device may provide a second SIP message to the network device, and may determine a third timestamp (T3) that represents the transmission time of the second SIP message by the user device (e.g., a time that the second SIP message was transmitted by the user device). For example, as shown, the second SIP message may include a response to the first SIP message, such as the response status code "180" (e.g., "Ringing").

In some implementations, the user device may include a device latency value in the second SIP message (e.g., inserted in a header, a body, or the like) and/or in association with the second SIP message. For example, the device latency value may represent the time between when the user device receives the first SIP message and when the user device provides the second SIP message. For example, the user device may determine the device latency value by determining the difference between the second timestamp (T2) and the third timestamp (T3).

Additionally, or alternatively, the user device may include, in and/or in association with the second SIP message, information identifying the request method associated with the first SIP message (e.g., "INVITE"), the second timestamp (T2), the third timestamp (T3), or the like. As shown by reference number 140, the network device may receive the second SIP message, and may determine a fourth timestamp (T4) that represents the receipt time of the second SIP message by the network device (e.g., a time that the second SIP message was received by the network device).

As shown in FIG. 1B, and by reference number 150, the network device may determine a network latency value. For example, the network latency value may represent the time between when the network device provides the first SIP message and when the user device receives the first SIP message and/or the time between when the user device provides the second SIP message and the network device receives the second SIP message. In other words, the network latency value may represent an amount of time that the first SIP message and/or the second SIP message is traveling via a network.

For example, the network device may determine the network latency value by determining a round-trip time for the SIP messages (e.g., by determining a first difference between the first timestamp and the fourth timestamp) and determining a total network latency value for the downlink and uplink (e.g., by determining a second difference between the first difference and the user device latency value). Additionally, or alternatively, the network device may estimate a downlink network latency value and/or an uplink network latency value by dividing the total network latency value by two. For example, the network device may associate information associated with the second SIP message (e.g., included in a header, a body, or the like) with information associated with the first SIP message (e.g., using the data structure). In this way, the network device may identify the first timestamp, and may use the first timestamp when estimating the network latency value.

As shown by reference number 160, the network device may provide the network latency value (e.g., the total network latency value, the downlink network latency value, and/or the uplink network latency value), the user device latency value, and/or other information to an analysis device. For example, the analysis device may collect network metrics (e.g., network latency values, user device latency values, information identifying the SIP message types, etc.), may store the network metrics (e.g., in a data structure), may provide the network metrics for display, and/or may provide an instruction to another device which may cause the other device to change a configuration, select a different transfer route, or the like.

In this way, a network operator may use the network metrics when designing or configuring a network, which may improve network latency, thereby conserving network resources and/or processor and/or memory resources of a user device. Additionally, implementations described herein may allow a network operator collect network metrics without requiring clock synchronization between a network device and a user device, thereby conserving network, processor, and/or memory resources.

As indicated above, FIGS. 1A and 1B are provided merely as an example. Other examples are possible and may differ from what was described with regard to FIGS. 1A and 1B.

Figure 2:
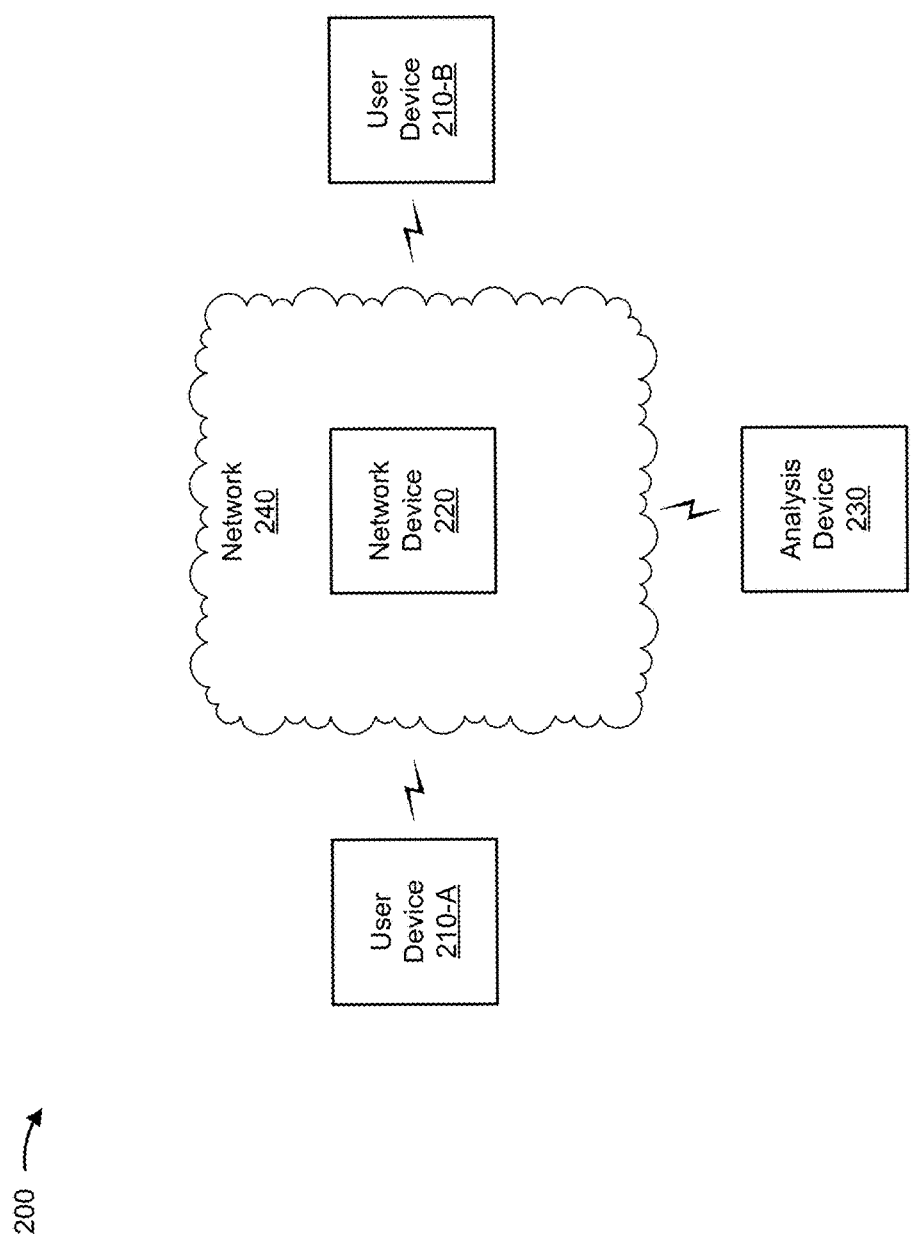
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210-A and 210-B (hereinafter referred to collectively as "user devices 210," and individually as "user device 210"), a network device 220, an analysis device 230, and a network 240. Devices of environment 200 may interconnect via wired connections, wireless connections, or a combination of wired and wireless connections.

User device 210 includes one or more devices capable of receiving, generating, storing, processing, and/or providing a SIP message and/or information associated with a SIP message. For example, user device 210 may include a communication and/or computing device, such as a mobile phone (e.g., a smart phone or a radiotelephone), a laptop computer, a tablet computer, a handheld computer, a gaming device, a wearable communication device (e.g., a smart wristwatch or a pair of smart eyeglasses), or a similar type of device. In some implementations, user device 210 may act as a user agent client (UAC) that may create a SIP request, and/or may act as a user agent server (UAS) that may generate a response to a SIP request.

Network device 220 includes one or more devices (e.g., one or more traffic transfer devices) capable of processing and/or transferring traffic between user devices 210. For example, network device 220 may include a firewall, a router, a gateway, a switch, a hub, a bridge, a reverse proxy, a server device (e.g., a proxy server, a Proxy-Call Session Control Function (P-CSCF) server, an outbound proxy server, a redirect server, or a registrar server), a security device, an intrusion detection device, a load balancer, or a similar device. In some implementations, network device 220 may communicate with user device 210 using a SIP message (e.g., may receive a SIP message from user device 210-A and may provide the SIP message to user device 210-B, or vice versa).

Analysis device 230 includes one or more devices capable of receiving, generating, storing, processing, and/or providing information associated with a network metric. For example, analysis device 230 may include a computing device, such as a server device or a similar type of device. In some implementations, analysis device 230 may receive information associated with a network metric associated with SIP messaging, may process and/or analyze a set of network metrics, may provide the information for display (e.g., to a network operator), and/or may provide an instruction to another device to cause the other device to change a configuration, select a different transfer route, or the like.

Network 240 may include one or more wired and/or wireless networks. For example, network 240 may include a cellular network (e.g., a long term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
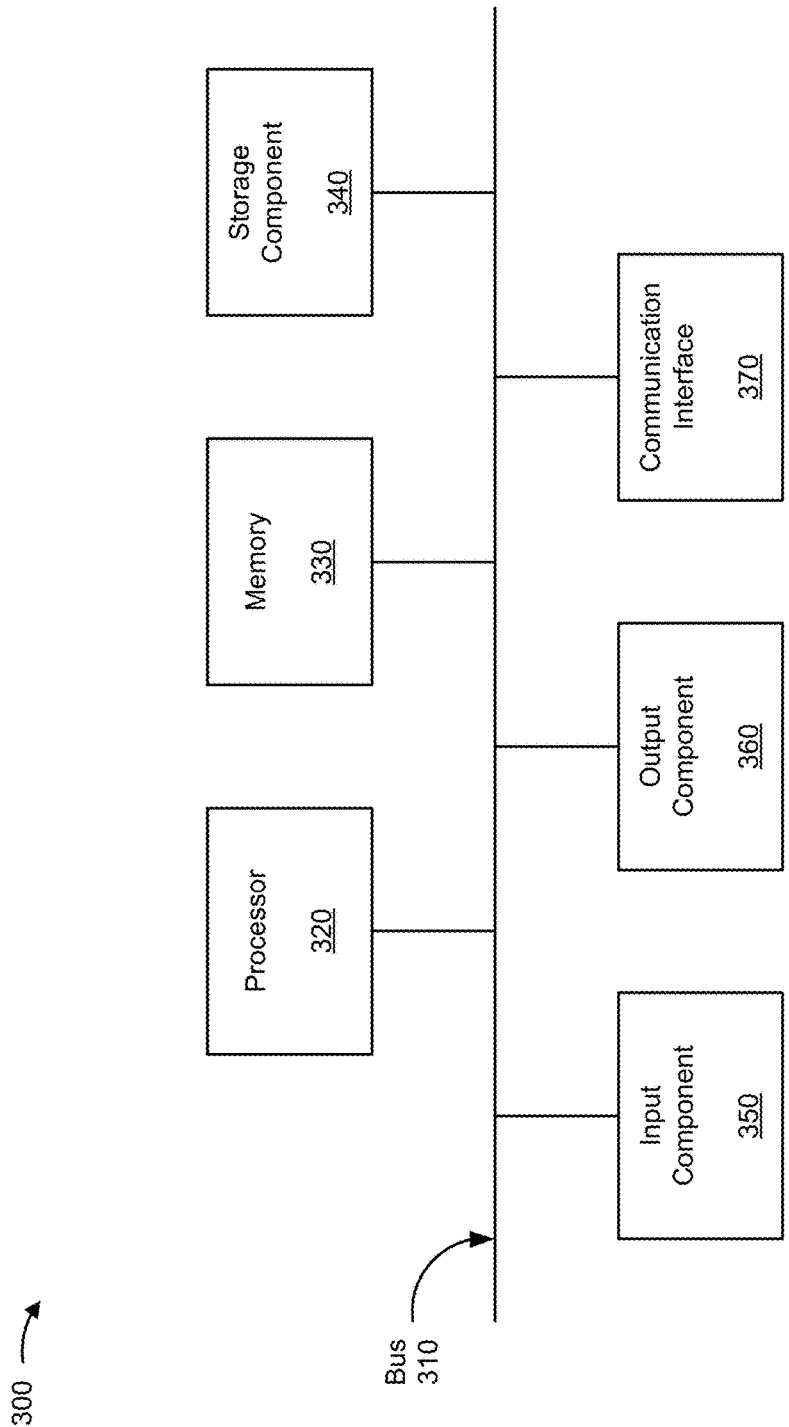
FIG. 3 is a diagram of example components of one or more devices of FIG. 2.

FIG. 3 is a diagram of example components of a device 300. Device 300 may correspond to user device 210, network device 220, and/or analysis device 230. In some implementations, user device 210, network device 220, and/or analysis device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
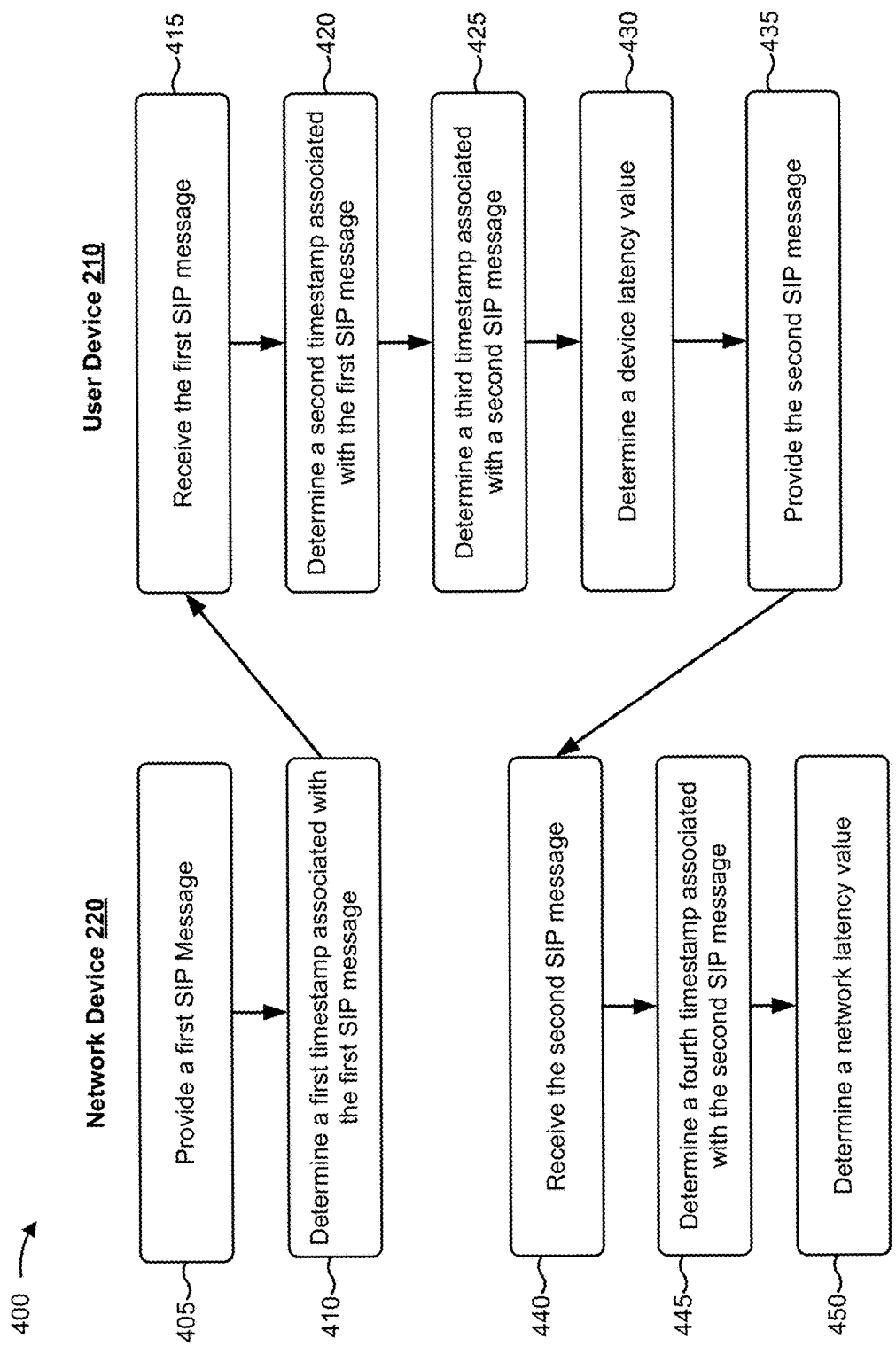
FIG. 4 is a flow chart of an example process for measuring SIP messaging latency.

FIG. 4 is a flow chart of an example process 400 for measuring SIP messaging latency. In some implementations, one or more process blocks of FIG. 4 may be performed by user device 210 and/or network device 220. In some implementations, one or more process blocks of FIG. 4 may be performed by another device or a group of devices separate from or including user device 210 and/or network device 220, such as analysis device 230.

As shown in FIG. 4, process 400 may include providing a first SIP message (block 405), and determining a first timestamp associated with the first SIP message (block 410). For example, network device 220 may provide a first SIP message to user device 210, and may determine a first timestamp associated with the first SIP message. In some implementations, network device 220 may receive the first SIP message from another user device 210, and may provide the first SIP message to user device 210 (e.g., a dialog may exist between user device 210 and the other user device 210).

In some implementations, the first SIP message may include a request method (e.g., "INVITE," "ACK," "BYE," "CANCEL," "OPTIONS," "REGISTER," "PRACK," "SUBSCRIBE," "NOTIFY," "PUBLISH," "INFO," "REFER," "MESSAGE," "UPDATE," or the like). Additionally, or alternatively, the first SIP message may include a response status code (e.g., "1xx," "2xx," "3xx," "4xx," "5xx," "6xx," or the like). Additionally, or alternatively, the first SIP message may include a unique identifier (e.g., a transmission control protocol (TCP) sequence number or the like).

In some implementations, network device 220 may determine a first timestamp associated with the first SIP message (e.g., a network device transmission timestamp). For example, the first timestamp may represent a transmission time at which network device 220 transmits the first SIP message to user device 210. In some implementations, network device 220 may store (e.g., in a data structure) information identifying the first timestamp and information associated with the first SIP message. For example, network device 220 may associate the first timestamp with information included in one or more header fields (e.g., a header field such as "To," "From," "Call Identifier (Call-ID)," "Command Sequence (CSeq)," "Via," or the like) of the first SIP message.

As further shown in FIG. 4, process 400 may include receiving the first SIP message (block 415), and determining a second timestamp associated with the first SIP message (block 420). For example, user device 210 may receive the first SIP message from network device 220, and may determine a second timestamp (e.g., a device receipt timestamp) associated with the first SIP message. For example, the second timestamp may represent a receipt time at which user device 210 receives the first SIP message from network device 220.

As further shown in FIG. 4, process 400 may include determining a third timestamp associated with a second SIP message (block 425), and determining a device latency value (block 430). For example, user device 210 may determine a third timestamp associated with a second SIP message, and may determine a device latency value. In some implementations, the third timestamp (e.g., a device transmission timestamp) may represent a transmission time at which user device 210 provides the second SIP message to network device 220.

In some implementations, the second SIP message may include a response to the first SIP message. For example, the second SIP message may include a request method (e.g., if the first SIP message included a response status code). Additionally, or alternatively, the second SIP message may include a response status code (e.g., if the first SIP message included a request method).

In some implementations, user device 210 may determine a device latency value. For example, the device latency value may represent a time difference between when user device 210 receives the first SIP message and when user device 210 provides the second SIP message. For example, user device 210 may determine the device latency value by determining a difference between the second timestamp and the third timestamp (e.g., by subtracting the second timestamp from the third timestamp, or vice versa).

As further shown in FIG. 4, process 400 may include providing the second SIP message (block 435). For example, user device 210 may provide the second SIP message to network device 220. In some implementations, user device 210 may include information, identifying the device latency value, in the second SIP message (e.g., in a header, a trailer, a payload, or the like). Additionally, or alternatively, user device 210 may include information, identifying the second timestamp and/or the third timestamp, in the second SIP message.

Additionally, or alternatively, user device 210 may include information, identifying a message type (e.g., a request method or a response status code) associated with the first SIP message, in the second SIP message. Additionally, or alternatively, user device 210 may include information, identifying a unique identifier associated with the first SIP message (e.g., a sequence number), in the second SIP message.

In some implementations, user device 210 may include information (e.g., the device latency value, the request method or response status code associated with the first SIP message, the second timestamp, the third timestamp, and/or the unique identifier) in the second SIP message using a private header (e.g., a P-header, a P-com header, a proprietary header, or the like). Additionally, or alternatively, user device 210 may provide the above information in association with the second SIP message.

As further shown in FIG. 4, process 400 may include receiving the second SIP message (block 440), and determining a fourth timestamp associated with the second SIP message (block 445). For example, network device 220 may receive the second SIP message from user device 210, and may determine a fourth timestamp associated with the second SIP message. For example, the fourth timestamp (e.g., a network device receipt timestamp) may represent a receipt time at which network device 220 receives the second SIP message from user device 210.

In some implementations, network device 220 may associate the second SIP message with the first SIP message. For example, network device 220 may identify information associated with the second SIP message (e.g., in a header or the like), and may associate the second SIP message with the first SIP message (e.g., using a data structure). In this way, network device 220 may associate the fourth timestamp with the first timestamp (e.g., to determine a network latency value, as described below).

As further shown in FIG. 4, process 400 may include determining a network latency value (block 450). For example, network device 220 may determine a network latency value. For example, the network latency value may represent a time difference between when network device 220 transmits the first SIP message and when user device 210 receives the first SIP message. Additionally, or alternatively, the network latency value may represent a time difference between when user device 210 transmits the second SIP message and when network device 220 receives the second SIP message.

In some implementations, network device 220 may determine the network latency value by determining a round-trip time for the SIP messages (e.g., by determining a first difference between the first timestamp and the fourth timestamp) and determining a total network latency value for the downlink and the uplink (e.g., by determining a second difference between the first difference and the user device latency value). Additionally, or alternatively, network device 220 may estimate a downlink network latency value and/or an uplink network latency value by dividing the total network latency value by two. For example, a clock associated with user device 210 may be independent of a clock associated with network device 220. In this way, network device 220 may estimate a downlink network latency value and/or an uplink network latency value without requiring that a clock associated with user device 210 be synchronized with a clock associated with network device 220.

Additionally, or alternatively, network device 220 may determine the downlink network latency value and/or the uplink network latency value. In some implementations, network device 220 and user device 210 may synchronize clocks (e.g., using a clock synchronization technique or the like). In such cases, network device 220 may determine the downlink network latency value by determining a difference between the second timestamp and the first timestamp and/or may determine the uplink network latency value by determining a difference between the fourth timestamp and the third timestamp.

Additionally, or alternatively, network device 220 and/or user device 210 may determine a clock offset value that represents a difference between a clock value associated with network device 220 and a clock value associated with user device 210. In such cases, network device 220 may determine the uplink network latency value and/or the downlink network latency value in a similar manner as described above while factoring in the clock offset value (e.g., subtracting the clock offset value, adding the clock offset value, or the like).

In some implementations, network device 220 may store information (e.g., in a data structure) associating a network latency value, a device latency value, a request method associated with the first or second SIP message, a response status code associated with the first or second SIP message, a unique identifier associated with the first or second SIP message, or the like. Additionally, or alternatively, network device 220 may provide the above information to analysis device 230. In this way, analysis device 230 may receive one or more metrics (e.g., the network latency value, the user device latency value, etc.), and may provide the one or more metrics for display, may analyze the one or more metrics, may provide an instruction to another device to cause the other device to perform an action (e.g., change a configuration or select a different transfer route), or the like.

In some implementations, network device 220 may provide the second SIP message to a second user device 210 communicating with a first user device 210 from which the second SIP message is received. In some implementations, network device 220 may remove information, included by the first user device 210, from the second SIP message (e.g., the device latency value, the second and/or third timestamp, or information associated with the first SIP message) before transmitting the second SIP message to the second user device 210, thereby conserving network resources, processor resources, and/or memory resources by reducing a quantity of information associated with the second SIP message. Additionally, processor and/or memory resources associated with other network devices may be conserved by removing information from the second SIP message that other network devices may not be able to process.

For example, network device 220 (e.g., a P-CSCF server) may receive the second SIP message and may remove information (e.g., the device latency value, the second and/or third timestamp, or the like) from the second SIP message (e.g., from a P-header). In this way, the message size of the second SIP message may be reduced before the second SIP message enters the IP Multimedia Subsystem (IMS) network, thereby conserving network resources and conserving processor and/or memory resources (e.g., by preventing complications associated with network elements that may not be able to process P-headers associated with the second SIP message).

Implementations described herein may assist a network operator in building or configuring a network in an efficient and latency-sensitive manner. For example, implementations described herein may allow a network operator to collect network metrics associated with SIP messaging. In this way, a network operator may improve network latency values, thereby conserving network resources and/or conserving user device processor and/or memory resources.

Additionally, implementations described herein may allow a network operator to collect network metrics without requiring clock synchronization between a network device and a user device, thereby conserving network, processor, and/or memory resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A and 5B are diagrams of example implementations 500 relating to example process 400 shown in FIG. 4. FIGS. 5A and 5B show examples of measuring SIP messaging latency.

As shown in FIG. 5A, user device 210 may be a recipient of a SIP request message. For example, as shown, network device 220 may transmit, at a first time (T1), a first SIP message including the request method "INVITE" to user device 210. As shown, user device 210 may receive the first SIP message at a second time (T2) and may transmit, at a third time (T3), a second SIP message including the response status code "180" (e.g., "Ringing") to network device 220. For example, user device 210 may determine a device latency value by calculating a difference between the third time and the second time. The second SIP message may include the device latency value (e.g., T3−T2). Additionally, network device 220 may receive the second SIP message at a fourth time (T4) and may determine a network latency value. For example, the network latency value may include an estimate for both the uplink latency value and the downlink latency value (e.g., ((T4−T1)−(T3−T2))/2).

As shown in FIG. 5B, user device 210 may be an originator of a request message. For example, as shown, network device 220 may transmit, at a first time (T1), a first SIP message including the response status code "200 OK" to user device 210. As shown, user device 210 may receive the first SIP message at a second time (T2), and may transmit, at a third time (T3), a second SIP message including the request method "ACK." Additionally, network device 220 may receive the second SIP message at a fourth time (T4), and may determine a network latency value in a similar manner as described above.

As indicated above, FIGS. 5A and 5B are provided merely as examples. Other examples are possible and may differ from what was described regarding FIGS. 5A and 5B.

FIGS. 6A-6D are diagrams of example implementations 600 relating to example process 400 shown in FIG. 4. FIGS. 6A-6D show examples of measuring SIP messaging latency.

Figure 6A:
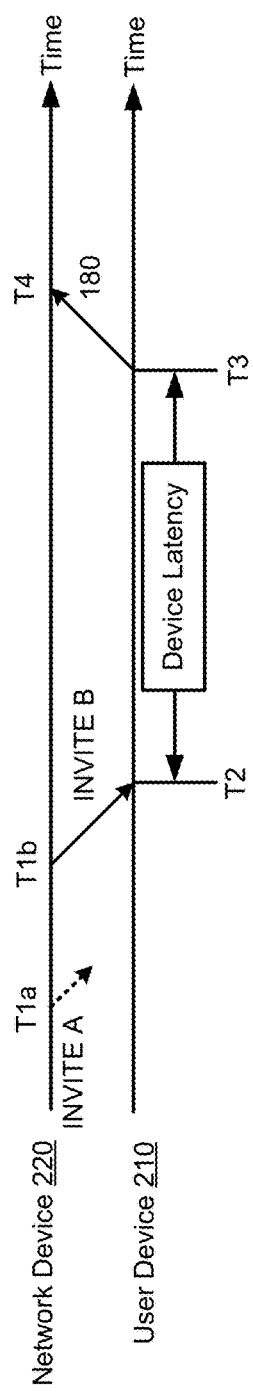
FIGS. 6A-6D are diagrams of example implementations relating to the example process shown in FIG. 4.

As shown in FIG. 6A, network device 220 may retransmit a SIP message to user device 210. For example, as shown, network device 220 may transmit, at a first time (T1a), a first SIP message including the request method "INVITE" (INVITE A). In this case, assume that user device 210 does not receive the first SIP message. As shown, network device 220 may transmit, at a second time (T1b), a second SIP message including another request method "INVITE" (INVITE B), and user device 210 may receive the second SIP message at a third time (T2). As shown, user device 210 may transmit, at a fourth time (T3), a third SIP message including the response status code "180," and network device 220 may receive the third SIP message at a fifth time (T4).

For example, network device 220 may determine a network latency value using the fifth time (T4) and the second time (T1b), in a similar manner as described above (e.g., ((T4−T1b)−(T3−T2))/2). In this way, network device 220 may correctly calculate the network latency value even if user device 210 does not receive the first SIP message transmitted at the first time (T1a). For example, network device 220 may identify that the third SIP message was provided in response to the second SIP message (INVITE B), and may use the second time (T1b) when determining the network latency value.

Figure 6B:
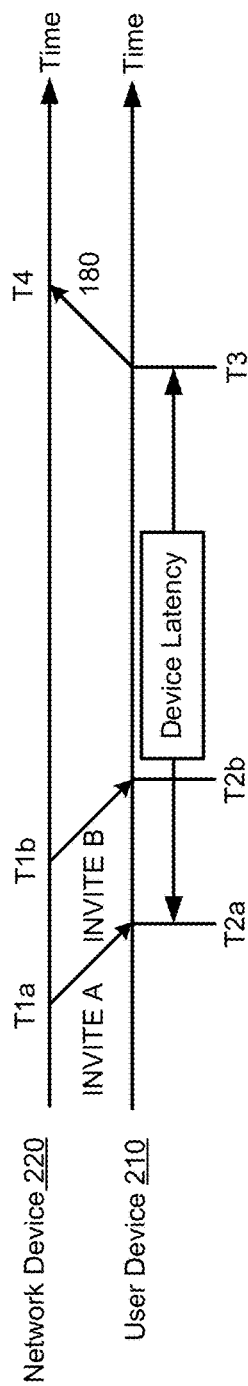

As shown in FIG. 6B, network device 220 may retransmit a SIP message to user device 210. For example, as shown, network device 220 may transmit, at a first time (T1a), a first SIP message including the request method "INVITE" (INVITE A), and user device 210 may receive the first SIP message at a second time (T2a). Additionally, as shown, network device 220 may transmit, at a third time (T1b), a second SIP message including another request method "INVITE" (INVITE B), and user device 210 may receive the second SIP message at a fourth time (T2b).

As shown, user device 210 may transmit, at a fifth time (T3), a third SIP message including the response status code "180." For example, user device 210 may determine a device latency value using the fifth time and the second time (T3−T2a), and may provide the device latency value to network device 220. For example, network device 220 may receive the third SIP message at a sixth time (T4) and may determine a network latency value using the sixth time and the first time (e.g., ((T4−T1a)−(T3−T2a))/2).

In this way, user device 210 may ignore the second SIP message (INVITE B), and may use the second time (T2a) when determining the device latency value. Additionally, network device 220 may identify that the third SIP message ("180") was provided in response to the first SIP message (INVITE A), and may use the first time (T1a) to determine the network latency value. In this way, network device 220 may accurately determine the network latency value.

Figure 6C:
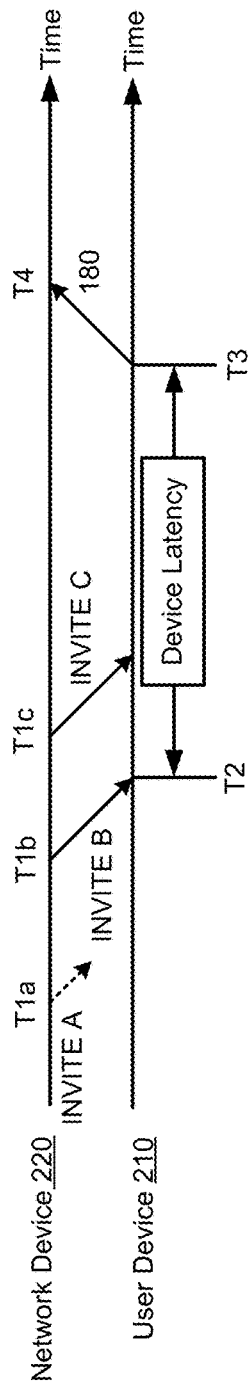

As shown in FIG. 6C, network device 220 may re-transmit a SIP message to user device 210 multiple times. For example, as shown, network device 220 may provide three SIP messages including the request method "INVITE" (INVITE A, INVITE B, and INVITE C) at three different times (T1a, T1b, and T1c). As shown, assume that user device 210 does not receive the first SIP message (INVITE A) and does receive the second and third SIP messages (INVITE B and INVITE C). In a similar manner as described above in connection with FIG. 6B, user device 210 may use the time at which user device 210 receives the second SIP message (INVITE B) to determine a device latency value.

Additionally, network device 220 may use the time at which network device 220 provided the second SIP message to determine a network latency value, in a similar manner as described above in connection with FIGS. 6A and 6B. For example, network device 220 may accurately determine the network latency value (e.g., ((T4−T1b)−(T3−T2))/2), in a similar manner as described above.

Figure 6D:
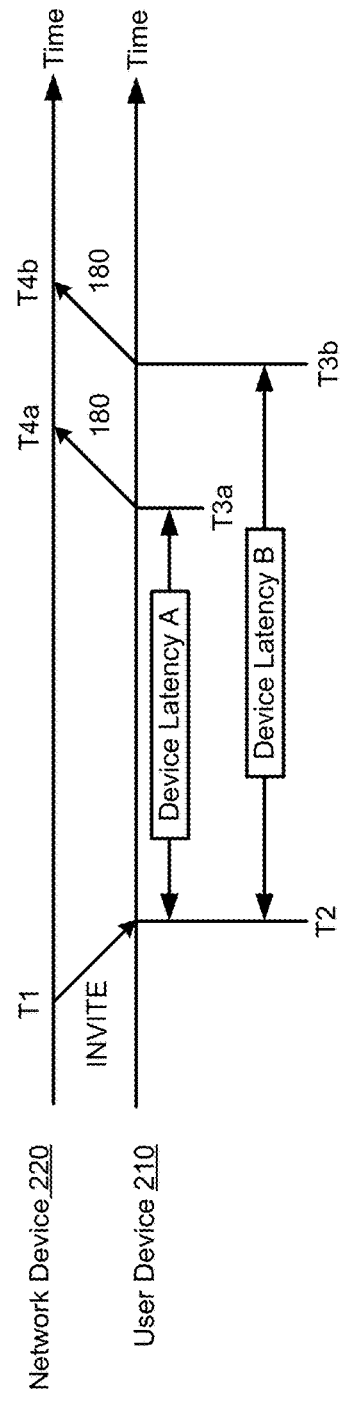

As shown in FIG. 6D, user device 210 may re-transmit a SIP message to network device 220. For example, as shown, network device 220 may transmit, at a first time (T1), a first SIP message including the request method "INVITE," and user device 210 may receive the first SIP message at a second time (T2). As shown, user device 210 may transmit, at a third time (T3a), a second SIP message including the response status code "180," and network device 220 may receive the second SIP message at a fourth time (T4a). In a similar manner as described above, network device 220 may determine a network latency value based on the third time and the fourth time (e.g., ((T4a−T1)−(T3a−T2))/2).

As further shown, user device 210 may transmit, at a fifth time (T3b), a third SIP message including another response status code "180," and network device 220 may receive the third SIP message at a sixth time (T4b). In a similar manner as described above, network device 220 may determine another network latency value based on the fifth time and the sixth time (e.g., ((T4b−T1)−(T3b−T2))/2). In this way, network device 220 may determine that the second SIP message and the third SIP message were provided in response to the first SIP message, and may determine two network latency values. For example, network device 220 may accurately determine the network latency value based on the third timestamp, the fourth timestamp, and a first device latency value (Device Latency A).

Additionally, or alternatively, network device 220 may determine another network latency value based on the fifth timestamp, the sixth timestamp, and a second device latency value (Device Latency B). Additionally, or alternatively, network device 220 may discard the second device latency value (Device Latency B) and may not determine another network latency value using the second device latency value (e.g., because the second SIP message and the third SIP message were both provided in response to the first SIP message and the first device latency value may more accurately reflect the device latency).

As indicated above, FIGS. 6A-6D are provided merely as examples. Other examples are possible and may differ from what was described regarding FIGS. 6A-6D.

FIGS. 7A and 7B are diagrams of example implementations 700 relating to example process 400 shown in FIG. 4. FIGS. 7A and 7B show examples of measuring SIP messaging latency.

As shown in FIG. 7A, user device 210 may receive multiple SIP messages, including the same response status code, which may be associated with different dialogs. For example, as shown, user device 210 may receive a first SIP message including the response status code "183" (e.g., "Session in Progress"), may provide a second SIP message including the request method "PRACK," and may provide a third SIP message including the request method "BYE," thereby terminating a dialog. Additionally, user device 210 may receive a fourth SIP message, associated with another dialog, including another response status code "183," and may provide a fifth SIP message including another request method "PRACK."

In some implementations, user device 210 may determine two different device latency values using timestamps associated with each respective dialog (e.g., Device Latency A=T3a−T2a and Device Latency B=T3b−T2b). Additionally, network device 220 may determine two different network latency values using timestamps associated with each respective dialog (e.g., ((T4a−T1a)−Device Latency A)/2 and ((T4b−T1b)−Device Latency B)/2). In this way, user device 210 and/or network device 220 may not use timestamps associated with different dialogs when determining device latency values and/or network latency values.

As shown in FIG. 7B, user device 210 may receive multiple SIP messages, including different response status codes (e.g., 18x response status codes), which may be associated with a same dialog. For example, as shown, user device 210 may receive a first SIP message including the response status code "180," and may provide a second SIP message including the request method "PRACK." Additionally, as shown, user device 210 may receive a third SIP message including the response status code "183," and may provide a fourth SIP message including the request method "PRACK." In a similar manner as described above, user device 210 may determine two device latency values (Device Latency A and Device Latency B), and network device 220 may determine two network latency values. In this way, network device 220 and user device 210 may not use timestamps associated with different SIP message pairs (e.g., 180-PRACK and 183-PRACK) when determining device latency values and/or network latency values.

As indicated above, FIGS. 7A and 7B are provided merely as examples. Other examples are possible and may differ from what was described regarding FIGS. 7A and 7B.

Figure 8:
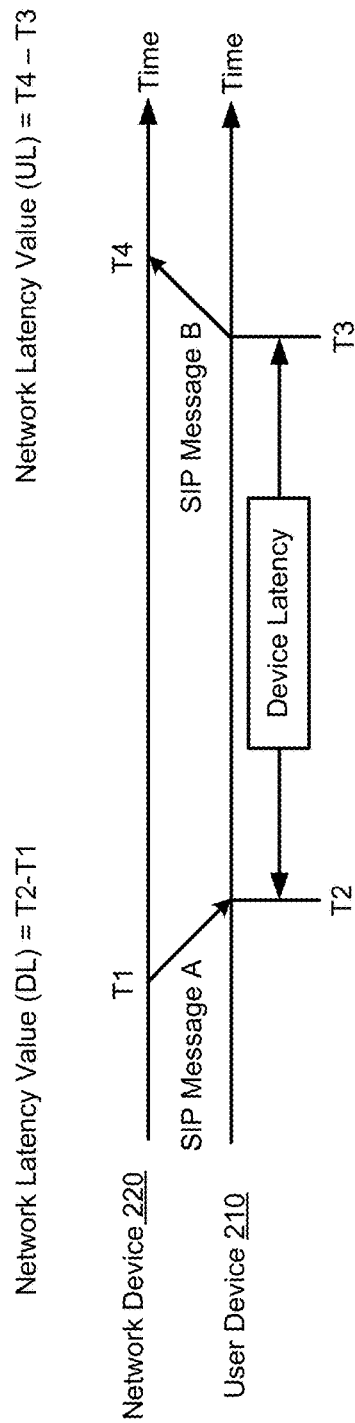
FIG. 8 is a diagram of an example implementation relating to the example process shown in FIG. 4.

FIG. 8 is a diagram of an example implementation 800 relating to example process 400 shown in FIG. 4. FIG. 8 shows an example of measuring SIP messaging latency.

As shown in FIG. 8, network device 220 may determine a downlink (DL) network latency value and an uplink (UL) network latency value. For example, network device 220 may transmit, at a first time (T1), a first SIP message (SIP Message A), and user device 210 may receive the first SIP message at a second time (T2). Additionally, user device 210 may transmit, at a third time (T3), a second SIP message (SIP Message B), and network device 220 may receive the second SIP message at a fourth time (T4). For example, SIP Message B may include a first timestamp associated with the second time (T2) and a second timestamp associated with the third time (T3).

In some implementations, network device 220 and user device 210 may synchronize clocks and/or may determine a clock offset value in a similar manner as described elsewhere herein. In such cases, network device 220 may determine a downlink network latency value associated with SIP Message A using the first timestamp (e.g., T2−T1), and may determine an uplink network latency value associated with SIP message B using the second timestamp (e.g., T4−T3). In this way, network device 220 may determine more accurate network latency values than as compared to other techniques used to determine network latency values.

Additionally, or alternatively, user device 210 may include a device latency value in the second SIP message, which may allow network device 220 to estimate a network latency value without requiring clock synchronization. However, estimating the network latency value in such a manner may be less precise than determining the uplink network latency value and the downlink network latency value using the second and third timestamps.

As indicated above, FIG. 8 is provided merely as an example. Other examples are possible and may differ from what was described regarding FIG. 8.

Implementations described herein may assist a network operator in collecting network metrics (e.g., network latency values or user device latency values). In this way, a network operator may use the network metrics when building or configuring a network, which may allow the network operator to reduce network latency associated with SIP messaging. Thereby, network resources may be conserved and processor and/or memory resources of a user device may be conserved. Additionally, implementations described herein may assist a network device in determining network latency values without requiring clock synchronization between the network device and a user device, thereby conserving network resources and/or processor and/or memory resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    providing, by a first device, a first session initiation protocol message to a second device;
    determining, by the first device, a first timestamp associated with the first session initiation protocol message,
        the first timestamp representing a transmission time of the first session initiation protocol message by the first device;
    receiving, by the first device, a second session initiation protocol message from the second device,
        the second session initiation protocol message being a response to the first session initiation protocol message, and
        the second session initiation protocol message including at least one of:
            a second timestamp representing a receipt time at which the second device receives the first session initiation protocol message,
            a third timestamp representing a transmission time at which the second device provides the second session initiation protocol message, or
            a device latency value for the second device that represents a difference between the second timestamp and the third timestamp;
    determining, by the first device, a fourth timestamp associated with the second session initiation protocol message,
        the fourth timestamp representing a receipt time of the second session initiation protocol message by the first device;
    determining, by the first device, a network latency value for the first device,
        the network latency value including an uplink latency value and a downlink latency value, and
        the network latency value being based on a difference, between the first timestamp and the fourth timestamp, and the device latency value;

determining, by the first device, a clock offset value,
the clock offset value representing a time difference between a first clock associated with the first device and a second clock associated with the second device; and providing, by the first device, the clock offset value to the second device.

2. The method of claim 1, where the first clock of the first device is independent of the second clock of the second device.

3. The method of claim 1, where the first clock of the first device is synchronized with the second clock of the second device.

4. The method of claim 1, where the first session initiation protocol message includes a message type,
the message type identifying a request method or a response status code; and
where the second session initiation protocol message includes information identifying the message type of the first session initiation protocol message.

5. The method of claim 1, where the first session initiation protocol message includes a sequence number; and
where the second session initiation protocol message includes information identifying the sequence number.

6. The method of claim 1, where the first session initiation protocol message includes a unique identifier.

7. A device, comprising:
a memory; and
one or more processors to:
provide a first session initiation protocol message to another device;
determine a first timestamp associated with the first session initiation protocol message,
the first timestamp representing a transmission time of the first session initiation protocol message by the device;
receive a second session initiation protocol message from the other device,
the second session initiation protocol message being a response to the first session initiation protocol message, and
the second session initiation protocol message including at least one of:
a second timestamp representing a receipt time at which the other device receives the first session initiation protocol message,
a third timestamp representing a transmission time at which the other device provides the second session initiation protocol message, or
a device latency value for the other device that represents a difference between the second timestamp and the third timestamp;
determine a fourth timestamp associated with the second session initiation protocol message,
the fourth timestamp representing a receipt time of the second session initiation protocol message by the device;
determine a network latency value,
the network latency value including an uplink latency value and a downlink latency value, and
the network latency value being based on a difference between the first timestamp and the fourth timestamp, and the device latency value;

determine a clock offset value,
the clock offset value representing a time difference between a first clock associated with the device and a second clock associated with the other device; and
provide the clock offset value to the other device.

8. The device of claim 7, where the first session initiation protocol message includes a message type,
the message type identifying a request method or a response status code; and
where the second session initiation protocol message includes information identifying the message type of the first session initiation protocol message.

9. The device of claim 7, where the one or more processors are further to:
send a third session initiation protocol message to the other device after sending the first session initiation protocol message and before receiving the second session initiation protocol message,
the third session initiation protocol message being associated with a fifth timestamp and being a retransmission of the first session initiation protocol message,
the fifth timestamp representing a transmission time of the third session initiation protocol message.

10. The device of claim 7, where the first session initiation protocol message includes a sequence number; and
where the second session initiation protocol message includes information identifying the sequence number.

11. The device of claim 7, where the first clock of the device is independent of the second clock of the other device.

12. The device of claim 7, where the first clock of the device is synchronized with the second clock of the other device.

13. The device of claim 7, where the first session initiation protocol message includes a unique identifier.

14. A non-transitory computer-readable medium storing instructions, the instructions comprising:
one or more instructions that, when executed by one or more processors of a first device, cause the one or more processors to:
provide a first session initiation protocol message to a second device;
determine a first timestamp associated with the first session initiation protocol message,
the first timestamp representing a transmission time of the first session initiation protocol message by the first device;
receive a second session initiation protocol message from the second device,
the second session initiation protocol message being a response to the first session initiation protocol message, and
the second session initiation protocol message including at least one of:
a second timestamp representing a receipt time at which the second device receives the first session initiation protocol message,
a third timestamp representing a transmission time at which the second device provides the second session initiation protocol message, or
a device latency value for the second device that represents a difference between the second timestamp and the third timestamp;
determine a fourth timestamp associated with the second session initiation protocol message, the fourth timestamp representing a receipt time of the second session initiation protocol message by the first device;

determine a network latency value,
the network latency value including an uplink latency value and a downlink latency value, and
the network latency value being based on the difference between the first timestamp and the fourth timestamp, and the device latency value;

determine a clock offset value,
the clock offset value representing a time difference between a first clock associated with the first device and a second clock associated with the second device; and provide the clock offset value to the second device.

15. The non-transitory computer-readable medium of claim 14, where the first session initiation protocol message includes a sequence number; and
where the second session initiation protocol message includes information identifying the sequence number.

16. The non-transitory computer-readable medium of claim 14, where the first session initiation protocol message includes a message type,
the message type identifying a request method or a response status code; and
where the second session initiation protocol message includes information identifying the message type of the first session initiation protocol message.

17. The non-transitory computer-readable medium of claim 14, where the one or more instructions, when executed by the one or more processors, further cause the one or more processors to:
send a third session initiation protocol message to the second device after sending the first session initiation protocol message and before receiving the second session initiation protocol message,
the third session initiation protocol message being associated with a fifth timestamp and being a retransmission of the first session initiation protocol message,
the fifth timestamp representing a transmission time of the third session initiation protocol message.

18. The non-transitory computer-readable medium of claim 14, where the first clock of the first device is independent of the second clock of the second device.

19. The non-transitory computer-readable medium of claim 14, where the first clock of the first device is synchronized with the second clock of the second device.

20. The non-transitory computer-readable medium of claim 14, where the first session initiation protocol message includes a unique identifier.

* * * * *